United States Patent [19]

Derrico

[11] Patent Number: 4,694,775

[45] Date of Patent: Sep. 22, 1987

[54] VAPOR PHASE PROCESSING MACHINE

[75] Inventor: Gerard G. Derrico, Maynard, Mass.

[73] Assignee: Dynapert-HTC Corporation, Concord, Mass.

[21] Appl. No.: 877,577

[22] Filed: Jun. 23, 1986

[51] Int. Cl.[4] .......................... B05C 15/00; B05C 5/02
[52] U.S. Cl. ........................................ 118/64; 118/74; 118/429; 118/326
[58] Field of Search .................... 118/64, 74, 65, 429, 118/61, 326; 34/76; 228/19, 37

[56] References Cited

U.S. PATENT DOCUMENTS 2,649,754  8/1953  Davis et al. ..................... 118/64 X
4,541,358  9/1985  Spigarelli et al. ............. 118/423 X Primary Examiner—John P. McIntosh
Attorney, Agent, or Firm—Spencer T. Smith

[57] ABSTRACT

A vapor phase processing machine is disclosed. The machine has an open tank which is sealed by a lid assembly which is universally free to move within selected limits established between the lid assembly and the closure arm to which it is secured.

3 Claims, 4 Drawing Figures

VAPOR PHASE PROCESSING MACHINE

In a vapor phase processing system, an electronic liquid which is contained within a tank is heated by heaters located within the contained fluid to generate a zone of saturated vapor. Work product is delivered by a conveyor to the saturated vapor zone for processing. Where the work product is presented at a substantially horizontal orientation and includes through-hole devices, molten solder may be applied to the bottom surface of the work product by a suitable solder applicator. In such systems, heating, soldering and leveling structure may be located within this tank.

It is an object of the present invention to provide a vapor phase system wherein the tank is readily accessible for maintenance or repair.

Other objects and advantages of the present invention will become apparent form the following portion of this specification and from the following drawings which illustrate in accordance with the mandate of the patent statutes a presently preferred embodiment incorporating the principles of the invention.

Figure 1:
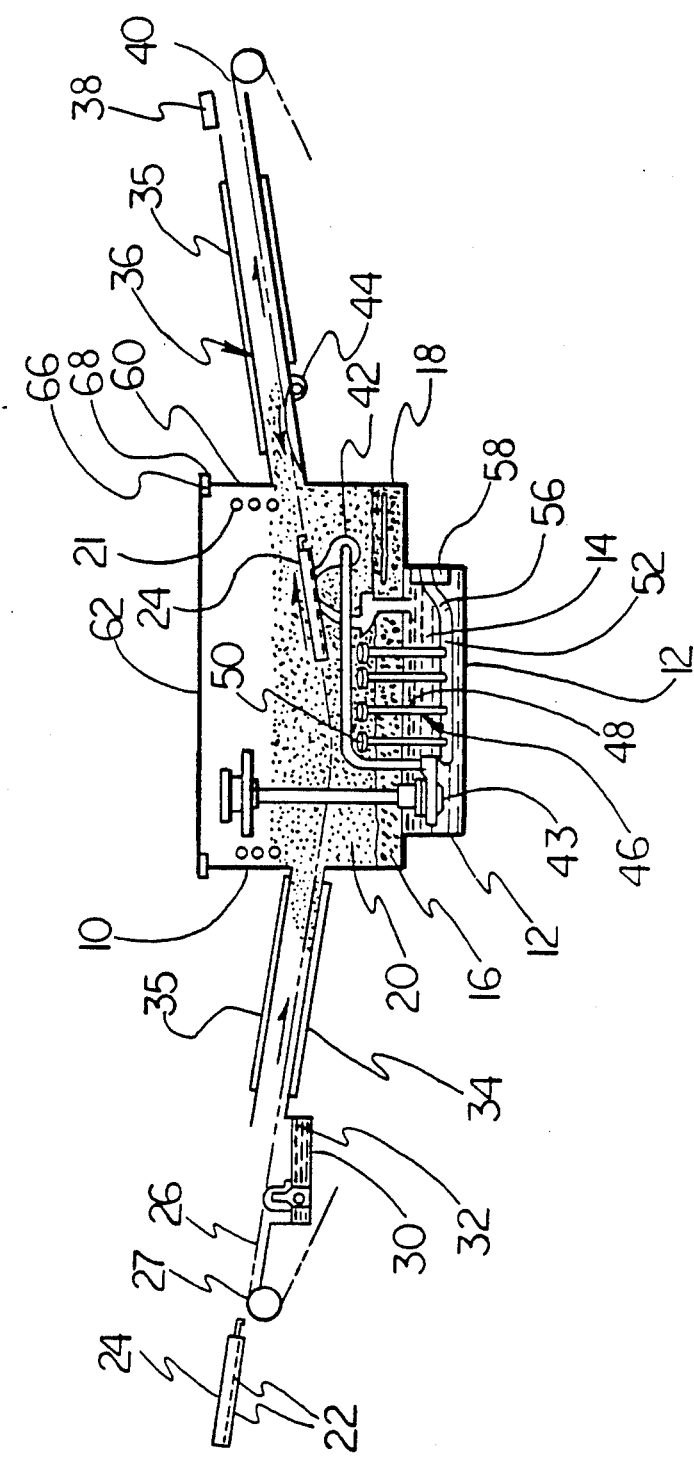
FIG. 1 is a schematic drawing of a vapor phase machine made in accordance with the teachings of the present invention.

The disclosed vapor phase processing system includes a tank 10 which has a sump 12 for containing solder 14. Electronic liquid 16 which is contained by the tank 10 and floats on the solder 14, is heated by immersion heaters 18 located within the electronic liquid to generate a zone 20 of saturated vapor. The height of this zone 20 is controlled by cooling coils 21. Work product (here boards 22 mounted on a carrier 24) is loaded onto a conveyor 26 at a load position 27. The conveyor carries the work product over a foam fluxer 30 which applies flux 32 to the bottom surface of the boards 22, through the downwardly inclined inlet throat 34 which is cooled by conventional cooling structure 35 and into the saturated vapor zone 20 for processing. The processed boards 22 are then carried through the upwardly inclined cooled 35 exit throat 36 past cooling fans 38 to the product off-load location 40.

Molten solder 14 is applied to the fluxed bottom surface of the boards 22 by a solder applicator 42 which is supplied by a suitable pump 43 and excess molten solder is removed by a leveling or debridging nozzle 44 which directs streams of electronic liquid 16 against the soldered surface of the boards 22. The solder 14 will be maintained at the temperature of the electronic liquid 16 as a result of heat transfer across the electronic liquid/solder interface. To enhance heat transfer to and from the solder, a heat transfer candle assembly 46 is utilized. This assembly includes a plurality of hollow vertical candles 48 that are suitably capped by slightly oversized caps 50 to prevent the entry of anything but vapor. These candles 48 communicate with a manifold 52 which includes an exhaust portion 56 and a mounting flange 58.

A pump (not shown) communicates with the candle assembly manifold 52 thereby drawinq hot saturated vapor from the saturated vapor zone 20 within the tank 10 into the candles 48 and through the manifold 52. Heat transfer to the solder accordingly takes place.

Figure 2:
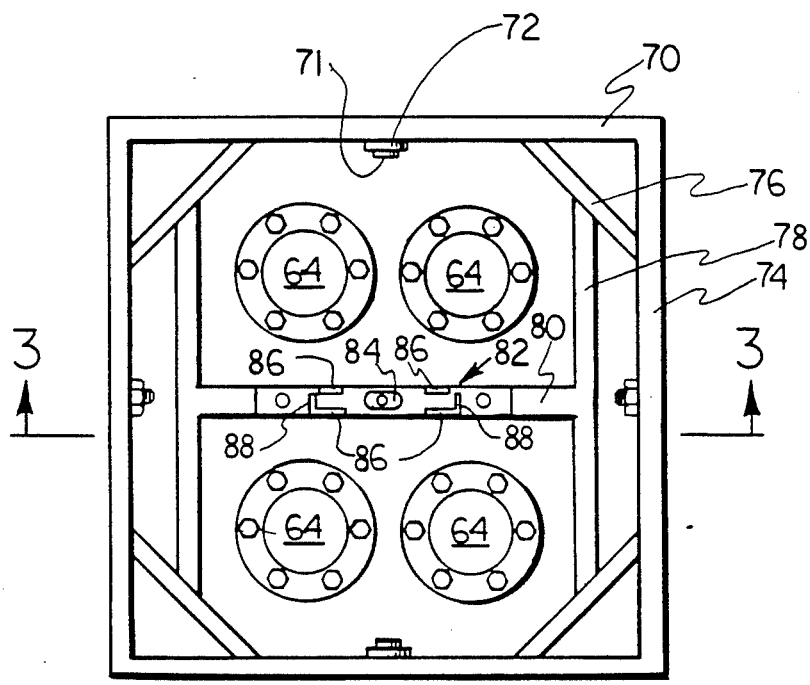
FIG. 2 is a top view of the lid assembly for the tank of the vapor phase machine illustrated schematically in FIG. 1.
Figure 3:
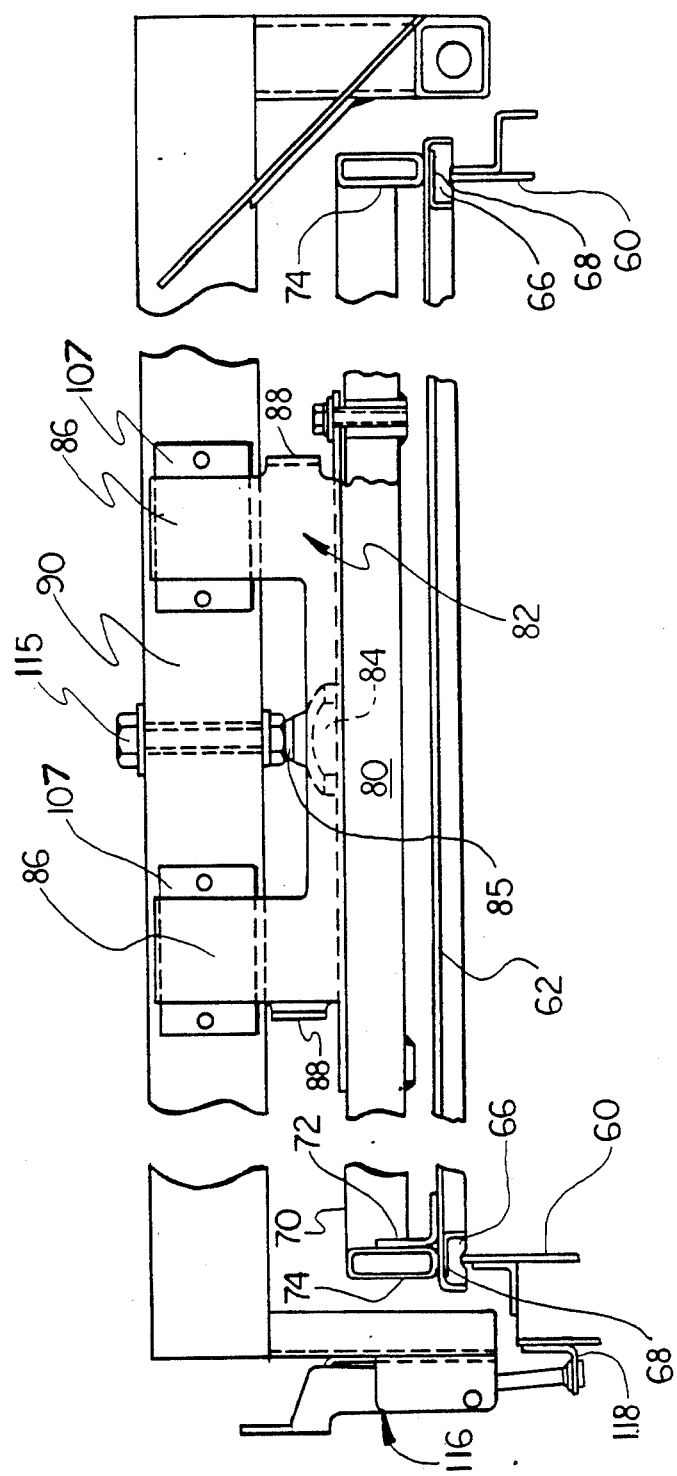
FIG. 3 is a view taken along lines 3—3 of FIG. 2 with the lid assembly secured to the closure mechanism.

The processing tank 10 is open at the top and has an upwardly projecting annular rim 60. The tank lid assembly includes a lid 62 which has a number of viewing windows 64 (FIG. 2). A seal 66 contained within an annular lid channel 68 overlies the tank rim 60. The lid assembly also includes a force distribution frame 70 which is secured in position on the lid 62 by suitable fasteners 71 which extend through four vertically extending lid brackets 72 into the frame 70. The frame 70 includes an annular portion 74 which overlies the channel, four corner brackets 76, a pair of cross bars 78 which extend between the corner brackets and a tie bar 80 which extends between the cross bars 78. Secured to the tie bar 80 is a lid attachment bracket 82. A machine leveling leg 84 (a universal joint having a threaded hole in the ball 85 —see FIG. 3) is secured to the base of the bracket to permit universal displacement of the frame and the lid attachment bracket includes three pairs of control struts to constrain such movement to within desired limits. To pairs of spaced vertical struts 86 project upwardly from the sides of the lid attachment bracket 82 and bent tabs 88 extend horizontally from opposite end struts 86 to define the third pair of control struts.

Figure 4:
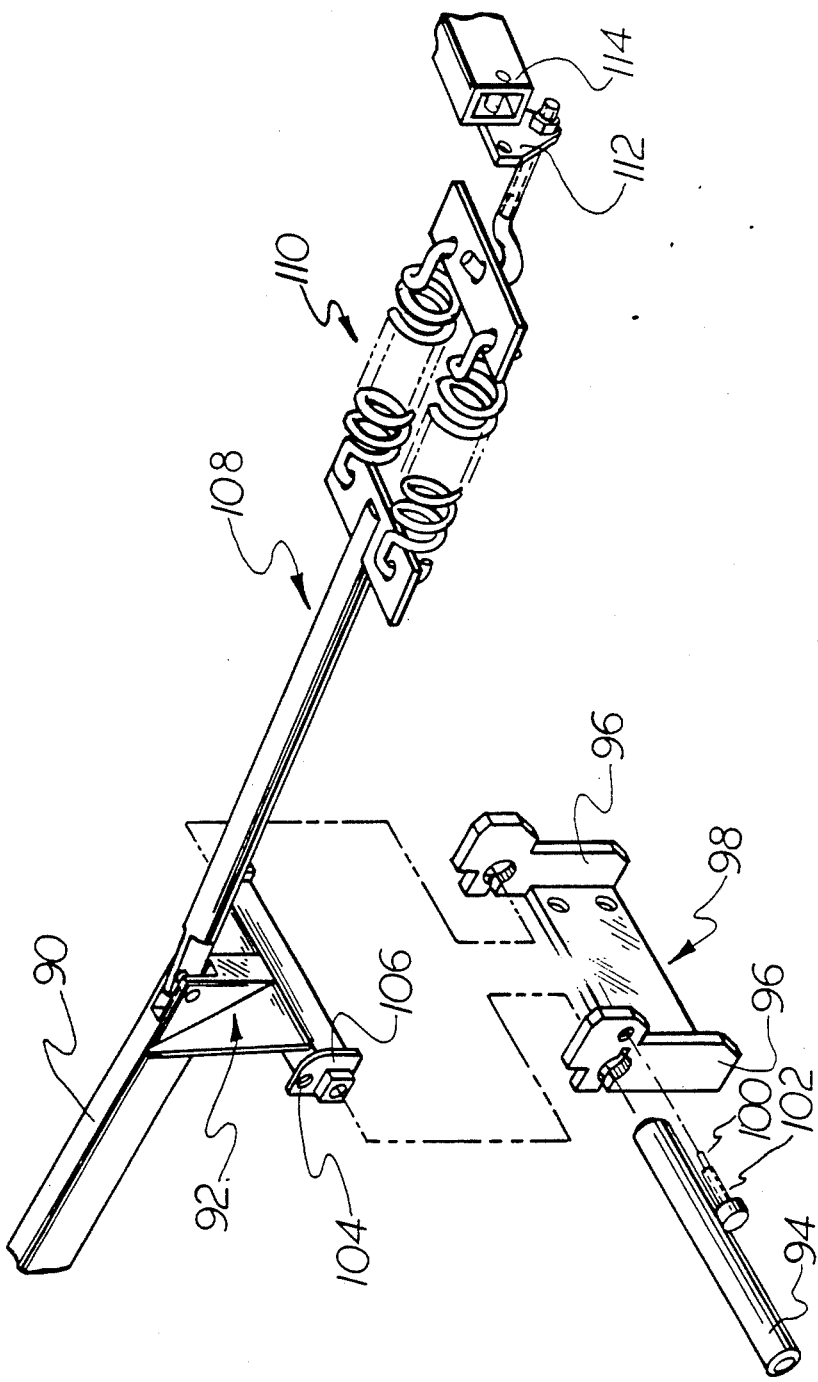
FIG. 4 is an oblique view illustrating a portion of the closure mechanism.

An arm 90 which includes a mounting bracket 92 (FIG. 4) is pivotally supported on a pivot shaft 94. This shaft 94 extends between spaced support plates 96 of a support assembly 98 which is secured to the tank wall. The arm 90 will be clamped in the vertical position when the pin 100 of a spring plunger 102 which is supported by one of the support plates 96 enters into the locating hole 104 of a latch mechanism 106 which is secured to the mounting bracket 92. To facilitate movement of the lid, a counterbalance 108 including a spring assembly 110 extends between the arm 90 and a mounting bracket 112 which is secured to a machine cross beam 114.

The hinged arm 90 is located between the vertical struts 86 and is secured to the machine léveling leg 84 by a suitable bolt 115. The spacing between these pairs of vertical struts is chosen so that the arm 90 (including its four Teflon wear plates 107) will be spaced from the vertical struts 86 thereby allowing limited side to side and swiveling movement. The arm 90 is also spaced above the horizontal tabs 88 so that a limited rocking movement can also take place.

When the arm 90 is rotated to the horizontal closed position, the lid accordingly is free to universally move to define a uniform seal between the annular seal 66 and the annular seating rim 60. The lid will be maintained in forced engagement with the tank by a latch mechanism 116 which is secured to the arm 90 and which engages a suitable catch 118 secured to the tank wall.

What is claimed is:

1. A vapor phase processing machine comprising
   a tank open at its top for containing an electronic liquid,
   means for vaporizing the electronic liquid to form a saturated vapor zone,
   inlet and outlet throats communicating with the sides of said tank, means for conveying product through said inlet throat into said tank and for conveying processed product from said tank through said outlet throat, means for closing the top opening of said tank, including a lid assembly having universal joint means, an arm hingedly secured to one side of said tank, means for connecting said arm and said universal joint means so that said lid assembly can move universally relative to said arm, and means for constraining said universal movement of said lid assembly relative to said arm to within selected limits.

2. A vapor phase processing machine according to claim 1, wherein said constraining means comprises first and second pairs of struts spaced from and extending vertically upwardly at eitter side of said arm.

3. A vapor phase processing machine according to claim 2 wherein said constraining means further comprises a third pair of spaced struts extending horizontally underneath said arm.

* * * * *